United States Patent
Molintas

(10) Patent No.: US 7,390,380 B1
(45) Date of Patent: Jun. 24, 2008

(54) PROCESSING OF SHIPBOARD WASTEWATER

(75) Inventor: Henry J. Molintas, Brookeville, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 713 days.

(21) Appl. No.: 10/777,160

(22) Filed: Feb. 11, 2004

Related U.S. Application Data

(62) Division of application No. 09/726,028, filed on Nov. 30, 2000, now Pat. No. 6,740,205.

(51) Int. Cl.
 *B01D 3/006* (2006.01)
 *B01D 3/01* (2006.01)
 *C02F 1/006* (2006.01)
 *B01D 1/00* (2006.01)

(52) U.S. Cl. .................... 203/88; 203/1; 203/2; 203/10; 203/11; 203/39; 203/91; 203/100; 203/DIG. 8; 159/2.1; 159/46; 159/47.1

(58) Field of Classification Search ................ 203/1–2, 203/10–11, 88, 91, 22, 27, 39, 100, DIG. 8; 159/2.1, 46, 47.1
See application file for complete search history.

(56) References Cited

U.S. PATENT DOCUMENTS

| | | | |
|---|---|---|---|
| 2,389,789 A | | 11/1945 | Latham, Jr. |
| 2,759,882 A | | 8/1956 | Worthen et al. |
| 2,994,647 A | * | 8/1961 | Fraser et al. ................ 202/187 |
| 3,152,053 A | | 10/1964 | Lynam |
| 3,305,455 A | | 2/1967 | Loebel |
| 3,388,045 A | | 6/1968 | Goeldner et al. |
| 3,433,717 A | | 3/1969 | Loebel |
| 3,489,652 A | | 1/1970 | Williamson |
| 3,501,384 A | | 3/1970 | Starmer |
| 3,572,588 A | * | 3/1971 | Hamilton, Jr. ............... 237/9 R |

(Continued)

OTHER PUBLICATIONS

U.S. Appl. No. 09/726,028, filed Nov. 2000, Molintas.

*Primary Examiner*—Virginia Manoharan
(74) *Attorney, Agent, or Firm*—Jacob Shueter; Dave A. Ghatt

(57) ABSTRACT

Incoming wastewater is preheated in a heat exchanger before delivery to a flash chamber through an orifice for flashing into water vapor rising into an upper section of the flash chamber which also has a bottom section into which liquid waste oil or other contaminants settles. Rise of such water vapor into the upper chamber section is induced by a vacuum established therein by a vacuum pump withdrawing the water vapor in a superheated and compressed condition for cooling within a condenser from which the incoming wastewater is delivered to a heat exchanger for preheating. The water vapor during rise into the upper section of the flash chamber is filtered to extract contaminates therefrom while liquefied water vapor thereafter formed therein is collected before the remaining water vapor is cooled into the condensate for collection within a distillate tank from which it is withdrawn for overboard discharge after being monitored for oil content. The waste oil and other contaminants in the flash chamber are also withdrawn for separate collection and storage. Such collections of the condensate extracted from the water vapor, the liquefied water vapor and the waste oil and other contaminants are effected by pumps driven under automatic control.

6 Claims, 1 Drawing Sheet

U.S. PATENT DOCUMENTS

| | | |
|---|---|---|
| 3,595,758 A | 7/1971 | Deputy, Jr. |
| 3,607,668 A | 9/1971 | Williamson |
| 3,730,848 A | 5/1973 | Kowalski |
| 4,525,243 A | 6/1985 | Miller |
| 4,953,694 A * | 9/1990 | Hayashi et al. ............ 202/180 |
| 5,376,238 A * | 12/1994 | Zambory .................... 203/11 |
| 5,932,091 A | 8/1999 | Tompkins et al. |
| 6,254,734 B1 * | 7/2001 | Sephton ........................ 203/2 |
| 6,454,907 B1 * | 9/2002 | Erdman ........................ 203/1 |
| 6,685,802 B1 * | 2/2004 | Nazzer ......................... 203/1 |

* cited by examiner

PROCESSING OF SHIPBOARD WASTEWATER

CROSS-REFERENCE TO RELATED APPLICATION

This application is a division of application Ser. No. 09/726,028, filed Nov. 30, 2000, now U.S. Pat. No. 6,740,205, entitled, "Processing of Shipboard Wastewater."

STATEMENT OF GOVERNMENT APPLICATION

The invention described herein may be manufactured and used by or for the Government of the United States of America for governmental purposes without the payment of any royalties thereon or therefore.

SUBSTITUTE SPECIFICATION

The present invention relates generally to a method for processing of wastewater onboard a marine vessel, involving flashing of the wastewater into water vapor.

Presently, liquid waste in the form of bilgewater is cleansed by processing systems which utilize ultrafiltration membranes to separate oil and water, as disclosed for example in U.S. Pat. Nos. 3,730,848 and 5,932,091 to Kowalski and Tompkins et al. Such processing systems rely on fine-sized membrane pores which create high fouling rate problems so as to require use of flushing modes and heavy duty recirculating pumps to wash membrane surfaces in order to prolong membrane life. It is accordingly, an important object of the present invention to provide a processing system for cleansing wastewater such as oily bilgewater that avoids reliance on ultrafiltration membranes subject to fouling and an unduly shortened life in the absence of extensive back flushing operational modes.

SUMMARY OF THE INVENTION

In accordance with the present invention, wastewater is processed in a flash chamber under vacuum established within an upper section thereof by a vacuum pump. Before delivery to the flash chamber, the wastewater is preheated in a heat exchanger to enhance subsequent flashing thereof effected by entry through an orifice. In the flash chamber the wastewater is converted to a water vapor portion in a single evaporation stage, and also into a contaminate portion having oil droplets. Water vapor produced by such flashing rises into and fills the upper chamber section, while liquid waste oil droplets are deposited into a bottom section of the flash chamber. A de-mister filters out contaminants from the rising water vapor entering the upper section of the flash chamber and liquefied water vapor is collected therebelow during removal of such rising water vapor from the flash chamber in a superheated or saturated condition for condensation by cooling. The water condensate and the waste oil are respectively withdrawn by distillate and drain pumps under automatic level sensing switch controls. The water condensate withdrawn by the distillate pump is conducted through an oil content monitor for overboard discharge from a distillate tank, while the waste oil or contaminants from the bottom of the flash chamber is delivered by the drain pump to a waste storage tank to which the water condensate is delivered when an excessive amount of contaminant is detected therein. Level sensors associated with the automatic pump drive controls shut down the distillate pump when the water condensate within the distillate tank drops below a predetermined level. On the other hand, the drain pump is turned on and off automatically under level sensor control in order to prevent it from running dry and to maintain the vacuum inside the flash chamber. An alarm is activated by a pressure sensor to alert the operator when the vacuum in the flash chamber is lost. When the desired vacuum pressure is attained for flashing to occur, the vacuum pump is automatically turned off under pressure control by the flash chamber pressure sensor.

Pursuant to one embodiment of the invention, processing involves use of a condenser to cool and condense the superheated and compressed water vapor withdrawn from the flash chamber. Heat is transferred to the incoming wastewater during its initial passage in a heat absorber coil through the rising water vapor within the lower section of the flash chamber. The wastewater is then conducted from the condenser to the heat exchanger to undergo preheating before delivery to the entry orifice in the flash chamber.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
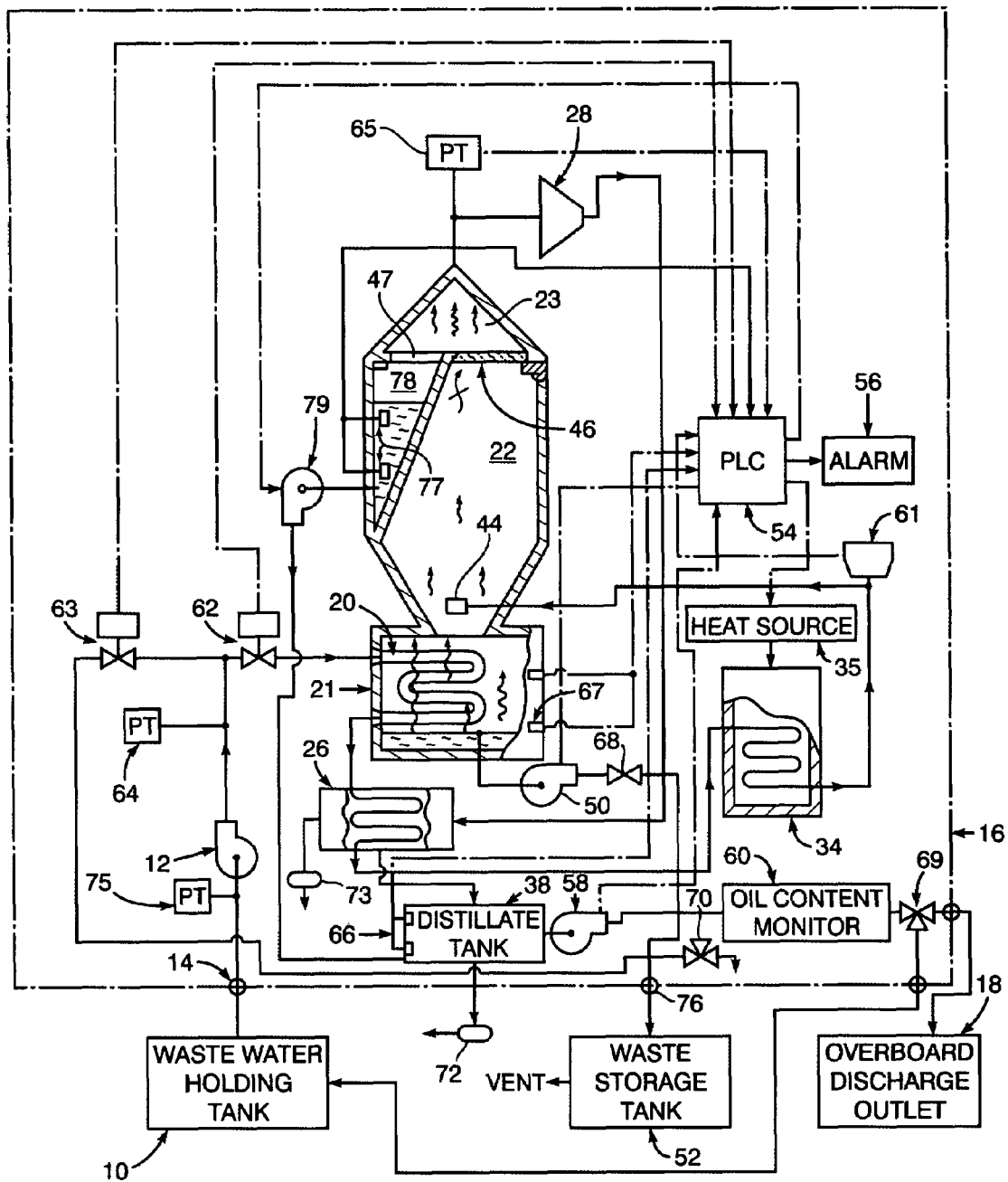
FIG. 1 is a schematic diagram depicting a wastewater processing system in accordance with one embodiment of the present invention, showing various components of the system interconnected by operational circuitry.

Referring now to the drawing FIG. 1 in detail, it diagrams a shipboard system for processing wastewater such as bilgewater or graywater received from a source such as a wastewater holding tank 10. According to the embodiment illustrated, the wastewater from the holding tank 10 is initially received through an inlet 14 into an inflow pump 12 for pressurization within a processor, generally referred to by reference numeral 16, from which an oil-free or contaminant free water condensate is obtained for overboard discharge through an outlet 18.

The wastewater from holding tank 10 after pressurization by pump 12 passes through a heat absorbing coil 20 located within a bottom section 21 of a flash chamber 22 in the processor 16. Heat from water vapor in the bottom section 21 is absorbed by the wastewater within the coil 20 before it is supplied to a condenser 26. The water vapor rising from the bottom section 21 when reaching an upper chamber section 23 of the flash chamber 22 after passing through a demister filter screen 46 is superheated and then withdrawn and compressed by a vacuum pump 28 for delivery in a superheated and compressed condition to the condenser 26 for cooling and condensation therein.

As the water vapor in the upper section 21 of the flash chamber 22 rises toward the suction side of the vacuum pump 28, some of such water vapor will be liquefied when sensible heat thereof is released. To collect such liquefied water vapor from the upper chamber section 23, a V-shaped trough 78 is formed within the flash chamber 22 below the upper section 23 into which the liquefied water vapor drops through a slot 47 in alignment with the filter screen 46. Two level sensors 77 detect upper and lower levels of liquefied water vapor collected in the trough 78 by means of signals sent to a programmable logic controller 54 so as to turn on and off a pump 79 through which the liquefied water vapor is withdrawn from the trough 78 and delivered to vented distillate tank 38. The lower most of the sensors 77 is located at a suitable predetermined height above the bottom of the trough 78 to establish a lower liquid level corresponding to a predetermined volume collected therein necessary to maintain a vacuum pressure within the flash chamber 22 when operation of the vacuum pump 28. The latent heat of condensation of the compressed and superheated water vapor delivered by the vacuum pump 28 from the upper chamber section 23 to the condenser 26 is accordingly transferred to the wastewater within tubing in the condenser 26 from which the wastewater is then delivered for further preheating to a heat exchanger 34. The condensate of the water vapor cooled in the condenser 26 is also fed to the vented distillate tank 38 within the processor 16.

Rise of the water vapor within the upper section 23 of the flash chamber 22 is enhanced by the vacuum maintained therein under operation of the vacuum pump 28, with the liquid waste oil or contaminants deposited into and retained within a bottom section 21 of the flash chamber 22. Such waste oil or contaminants in the bottom section 21 is derived from the wastewater heated in the condenser 26 and preheated further within the heat exchanger 34 to a predetermined temperature level, such as approximately 175°, before delivery to the flash chamber 22 through an entry orifice 44 to enhance flashing thereof within the flash chamber 22. In the flash chamber 22 the wastewater is converted to a water vapor portion in a single evaporation stage, and also into a contaminate portion having oil droplets. A portion of such wastewater which flashes into water vapor within the flash chamber 22 rises into the upper chamber section 23. Heat is supplied for wastewater preheating to the heat exchanger 34 from a suitable source 35, such as an existing hot water supply system or an electric heater, under control of a temperature transducer 61 as hereinafter explained. source 35, such as an existing hot water supply system or an electric heater, under control of a temperature transducer 61 as hereinafter explained.

When sufficient heat is removed from the superheated and compressed water vapor within the condenser 26 during performance of its cooling function as aforementioned, such water vapor is condensed and delivered as a condensate to the distillate tank 38. Such condensate collected within the distillate tank 38 is directly delivered from the condenser 26 after cooling and condensation of the rising water vapor in the upper section 23 of the flash chamber 22 delivered thereto by the vacuum pump 28. Oil mist or other liquid contaminants are filtered out by the filter screen 46 (which is of a type generally known in the art) from the rising water vapor entering the upper section 23 of the flash chamber 22 to limit the collection within the distillate tank 38 to condensate free of such contaminate.

Oil and other contaminants in the bottom section 21 of the flash chamber 22, are withdrawn therefrom by a drain pump 50 for storage in a vented waste storage tank 52 connected by an outlet 76 to a relief valve 70 and a valve 68 through which the outlet of the drain pump 50 is delivered to the oil tank 52. Operational drive of the drain pump 50 is automatically regulated through the programmable logic controller 54 aforementioned, in response to level sensors 67 on the bottom section 21 of the flash chamber 22, set to maintain the desired vacuum pressure therein as well as to prevent overflow of the flash chamber 22. Should the pressure in the flash chamber 22 rise above a predetermine value, system shut-down is effected by the control 54, as well as to sound an operator alerting alarm 56.

A distillate pump 58 is also provided for removal of condensate collected within the distillate tank 38 from the condenser 26 and the liquid collection trough 78. The pump 58 directs such condensate to the overboard discharge outlet 18 through an oil content monitor 60. Automatic operation of the pump 58 is effected under control of the programmable logic controller 54. Accordingly, when the condensate in the distillate tank 38 drops below a certain predetermined level, as detected by a sensor 66, the pump 58 is turned off. When the condensate then rises above another predetermined level in the distillate tank 38, the pump 58 is turned on to prevent overflowing. Air venting devices 72 and 73 are respectively connected to the distillate tank 38 and the condenser 26 to vent out non-condensate gases.

In regard to the upper section 23 of the flash chamber 22 in the processor 16, the rising water vapor which is maintained under vacuum therein established by the vacuum pump 28, is withdrawn by the pump 28 in a compressed condition to increase both its temperature and pressure.

In regard to the control system associated with the processor 16, the temperature transducer 61 associated with the controller 54 is set to maintain the wastewater operating temperature at about 175 degrees Fahrenheit by controlling the source of heat 35 for the heat exchanger 34. If the temperature goes up higher than the set operating temperature, the heat source 35 will be turned off. If the temperature drops to 165 degrees Fahrenheit, heat source 35 will turn back on. The flash chamber level sensors 67 will have either a high or low setting. When the level of oil in the bottom section 21 of the flash chamber 22 drops below a predetermined level, a signal is sent to the programmable logic controller 54 which will turn off the drain pump 50. If the level goes up to a predetermined level, it will turn on the drain pump 50. The level sensors 66 on the distillate tank 38 operate in the same way and also send an electrical signal to the programmable logic controller 54 to turn on the pump 58. The level sensors 66 on the distillate tank 38 thus operate to send an electrical signal to the programmable logic controller 54 which in turn controls operation of the distillate pump 58. A pressure transducer 65 controls operation of the vacuum pump 28 so that when the pressure drops to a predetermined level, the vacuum pump 28 shuts off. Should the pressure rise above a predetermined level at the suction side of the vacuum pump 28, the pressure transducer 65 sends a signal to the programmable logic controller 54 to turn on the vacuum pump 28. In order to avoid on and off cycling of the vacuum pump 28 during normal operation, the vacuum pump 28 will also have a built in capacity controller. When the load varies, the vacuum pump 28 will accordingly operate proportionately by automatically adjusting its own capacity to match the load. When the pressure as detected by the pressure transducer 65 rises above a predetermined level, a signal is sent to the programmable logic controller 54 to close valve 62 and open valve 63. In this way, all oil and other high viscous fluid emulsions are sent directly to the waste storage tank 52, thus bypassing the flash chamber 22. Should the pressure rise above a predetermined value set by the pressure transducer 75 for a predetermined time duration, a signal is sent to the programmable logic controller 54 causing the processor 16 to go into a shutdown mode.

Under the shutdown mode, the controller 54 will turn off the inflow pump 12. After such turn off in a typical shutdown mode, the controller 54 will respond to existing conditions detected by level sensors 67 and 66. Should the level sensors 67 and 66 indicate that levels are above their respective low settings, the controller will turn on both the distillate and drain the pumps 58 and 50 until the fluid levels reach their predetermined low settings. Additionally, the controller 54 will also turn off the heat source 35 and the vacuum pump 28.

The shutdown mode will therefore occur only when the inflow pump 12 is not drawing suction from the wastewater holding tank 10.

Obviously, other modifications and variations of the present invention may be possible in light of the foregoing teachings. It is therefore to be understood that within the scope of the appended claims the invention may be practiced otherwise than as specifically described.

What is claimed is:

1. A method of processing wastewater comprising:
   providing a wastewater processing apparatus, the wastewater processing apparatus comprising:
   a wastewater holding tank;
   a flash chamber having an upper section and a bottom section;
   a filtering device at the upper section of the flash chamber;
   a collection tank connected to the upper section of the flash chamber;
   a vacuum pump connected to the upper section of the flash chamber;
   a heat absorbing coil within the bottom section of the flash chamber;
   a condenser connected to the flash chamber;
   a distillate tank operably connected to the condenser;
   a heat exchanger;
   an orifice connecting the heat exchanger to the flash chamber; and
   a waste storage tank operably connected to the flash chamber at the lower section thereof;
   drawing wastewater from the wastewater holding tank;
   feeding the wastewater through the heat absorbing coil within the bottom section of the flash chamber;
   feeding the wastewater from the heat absorbing coil of the condenser;
   feeding the wastewater from the condenser to the heat exchanger;
   heating the wastewater in the heat exchanger;
   feeding the heated wastewater through an entry office within the flash chamber for conversion into a vapor portion during a single evaporation stage and a contaminate portion, wherein the vapor portion rises to the upper section of the flash chamber, and the contaminate portion settles in the bottom section of the flash chamber;
   withdrawing the contaminate portion from the bottom section of the flash chamber; and
   feeding said contaminate portion to the waste storage tank.

2. The method as defined in claim 1, further comprising:
   drawing the vapor portion through the filtering device under vacuum pressure created by the vacuum pump, creating a vapor filtrate and a condensate filtrate;
   collecting the condensate filtrate in the collection tank connected to the upper section of the flash chamber; and
   discharging the condensate filtrate from the collection tank when the condensate filtrate exceeds a predetermined condensate level; and
   feeding said discharged condensate filtrate to the distillate tank for temporarily storing the condensate filtrate.

3. The method as defined in claim 2, further comprising:
   drawing the vapor filtrate from the upper section of the flash chamber into the condenser to obtain a second condensate;
   feeding said second condensate from the condenser to the distillate tank for temporarily storing said second condensate; and
   discharging a condensate mixture of said condensate filtrate and said second condensate from the distillate tank to an overboard discharge outlet when the condensate exceeds a predetermined condensate level.

4. The method as defined in claim 3, further comprising:
   feeding the condensate mixture to an oil content monitor prior to feeding to the overboard discharge outlet.

5. The method as defined in claim 4, further comprising:
   monitoring and regulating the pressure within the flash chamber.

6. The method as defined in claim 5, wherein the wastewater in the heat exchanger is heated to a temperature of about 175° F.

\* \* \* \* \*